May 16, 1950     H. KLEMPERER     2,508,115
IMPULSE RESISTANCE WELDER

Filed Dec. 23, 1942     2 Sheets-Sheet 1

INVENTOR.
HANS KLEMPERER,
BY Elmer J. Gorn
ATTY.

May 16, 1950        H. KLEMPERER        2,508,115
IMPULSE RESISTANCE WELDER
Filed Dec. 23, 1942        2 Sheets-Sheet 2
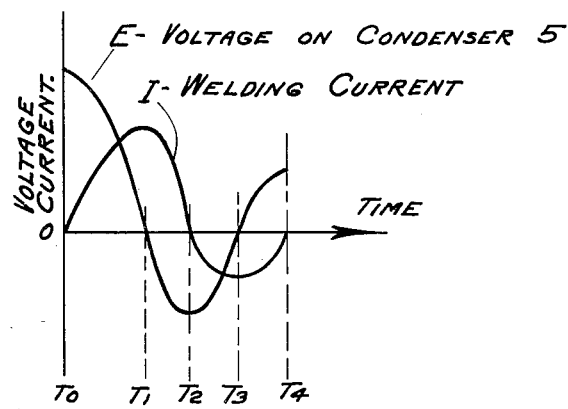
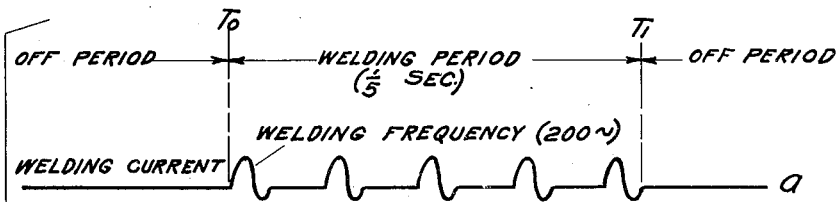
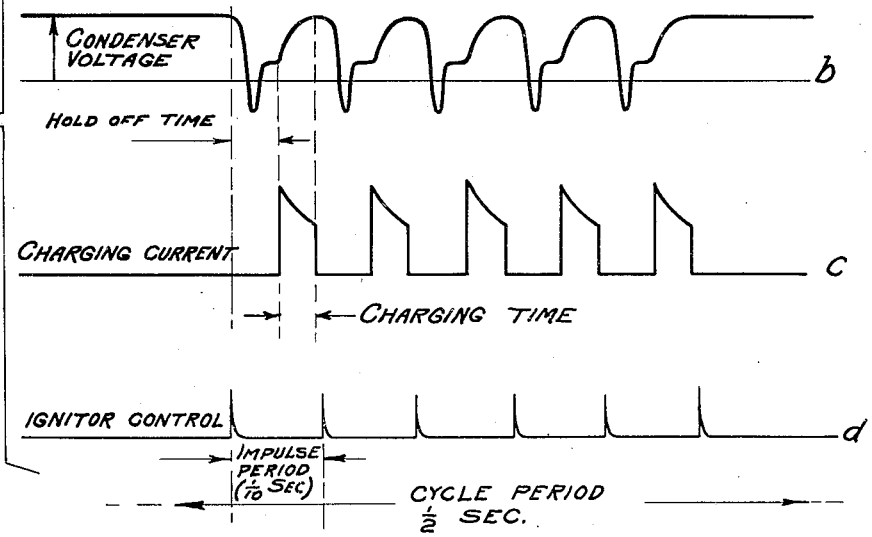
INVENTOR.
HANS KLEMPERER,
BY Elmer J. Gorn
ATTY.

Patented May 16, 1950

2,508,115

UNITED STATES PATENT OFFICE 2,508,115

IMPULSE RESISTANCE WELDER

Hans Klemperer, Belmont, Mass., assignor to Raytheon Manufacturing Company, Newton, Mass., a corporation of Delaware Application December 23, 1942, Serial No. 469,863

22 Claims. (Cl. 219—4)

This invention relates to a resistance welding system, and more particularly to such a system in which a series of pulses of current are supplied to the load in order to produce a desired welding operation.

It is well known in the art to supply energy to the welding load to effect a welding cycle. Such welding cycle may include one or more periods during which energy is supplied to the work for preheating purposes, a period during which more energy is supplied to effect the actual welding operation i. e., the fusion of the two or more parts of the work together, and this last period may, if desired be followed by a subsequent period during which additional energy is supplied to the work for annealing purposes. For the purposes of the present application it will be understood that the term welding operation refers to the fusion of the work and is considered independent of such other operations which may be added or omitted as desired to effect the complete welding cycle.

Heretofore pulses of current derived from a commercial line frequency source, such as a sixty-cycle source, were utilized for welding purposes. Such pulses usually consisted of a predetermined number of cycles or half cycles of current. However, the use of current pulses of this kind resulted in various drawbacks. In order to transform the current at the standard commercial frequency, relatively large sizes of transformer were necessary. It was also necessary to draw all of the power from the single phase line instead of the more desirable practice of drawing a balanced load from a three-phase line. In an attempt to increase the power supplied to the welding load, the secondary voltage of the welding transformer was raised to undesirable high values. Such previous systems also have been relatively inflexible, and thus not adaptable to a wide variety of welding loads.

An object of this invention is to decrease the size of the welding transformer and associated parts.

A further object is to provide for increased flexibility in the adjustment of a welding system of the foregoing type.

A still further object is to enable balanced loads to be drawn from a three-phase or other plural-phase line with a welding system of the above type.

The foregoing and other objects of this invention will be best understood from the following description of an exemplification thereof, reference being had to the accompanying drawings, wherein:

Fig. 2 is a pair of curves illustrating the mode of operation of the system shown in Fig. 1; and Fig. 3 is a set of curves illustrating the relationships between the various currents and voltages occurring in the arrangement of Fig. 1 during the operation thereof.

Figure 1:
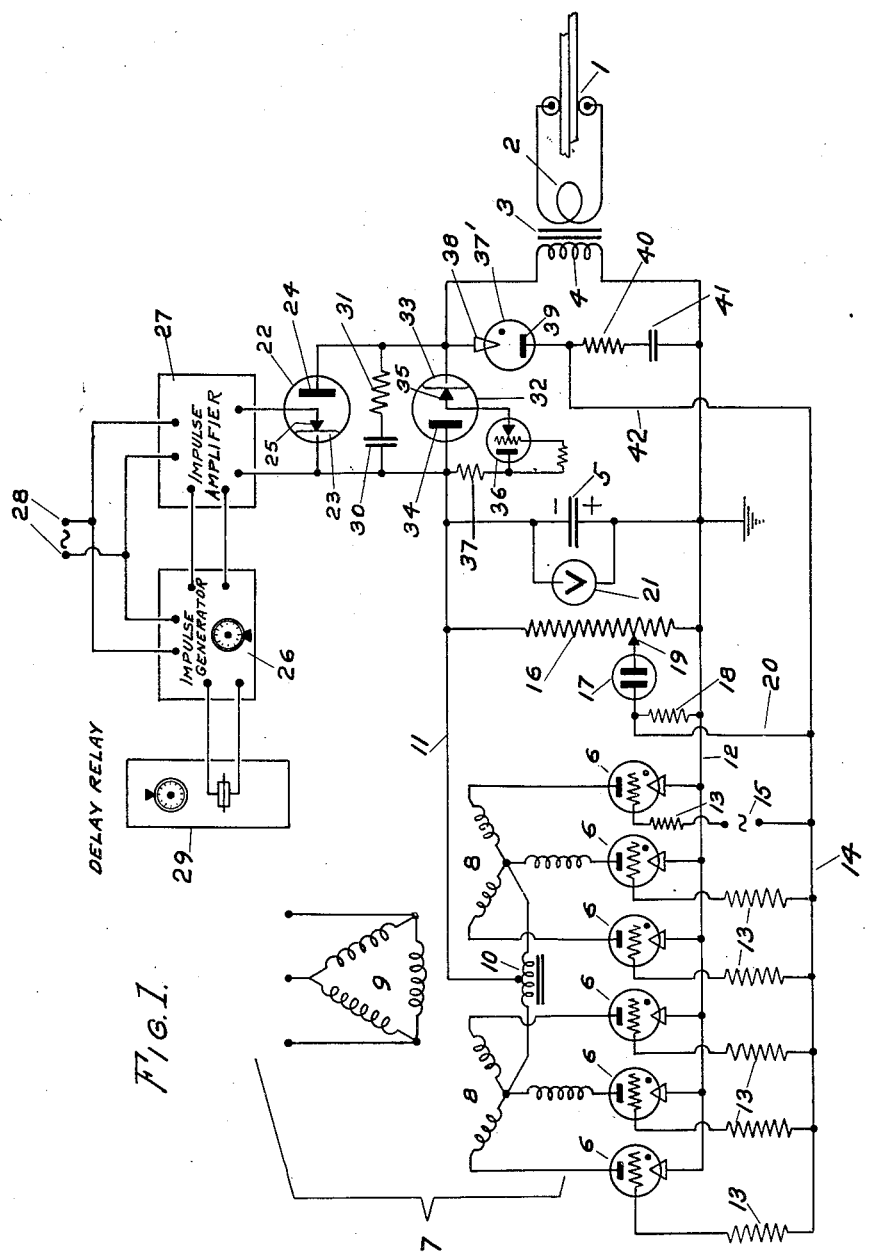
Fig. 1 is a diagrammatic sketch of a system embodying my invention.

The system illustrated in Fig. 1 comprises a welding load 1 which may either be of the ordinary spot resistance welding type, but is preferably a seam welding load. The resistance welding load 1 is supplied with welding current from the secondary 2 of a welding transformer 3 whose primary 4 is adapted to be supplied with the desired pulses of current from a condenser 5. The condenser 5 is charged to the desired voltage from a suitable source of direct current, such as a series of grid-controlled rectifier tubes 6. The tubes 6 may be arranged in a full-wave rectifying system energized from a three-phase transformer 7 having a pair of secondary windings 8, each arranged in a star connection. The transformer 7 also has a primary winding 9 arranged preferably in a delta connection and energized from a suitable three-phase source of alternating current. The neutral points of the two secondary windings 8 are interconnected by an interphase reactor 10 from the center point of which extends the negative lead 11 of the rectified current supply. The outer end of each coil of the secondary windings 8 is connected to one of the anodes of one of the rectifiers 6. The cathodes of the rectifiers 6 are all connected to the positive lead 12 of the rectified current supply. The condenser 5 is connected between the positive and negative leads 11 and 12 so as to become charged by the rectified current supplied thereto.

In order to control the voltage delivered by the rectifier 6, each grid of these rectifiers is connected through a high resistance 13 to a grid control lead 14. One of the grids may have a source of alternating current 15 connected in series with the resistance 13 so as to cause said rectifier tube to supply a final trickle charge to the condenser 15 as it approaches the desired final value of voltage thereon. This operation is described more fully and claimed in the copending application of John W. Dawson, Serial No. 312,712, filed January 6, 1940, now Patent No. 2,483,691, dated October 4, 1949. The voltage which is supplied to the grid control lead 14 is derived from a potentiometer 16 connected across the condenser 5. A glow discharge tube 17 in series with a resistance 18 is connected from an adjustable point 19 on the potentiometer 16 to the positive or cathode lead 12. The voltage across the resistance 18 is connected by means of a conductor 20 to the grid control lead 14.

As the voltage on the condenser 5 rises, the voltage applied to the glow tube 17 reaches a point at which that glow tube starts to conduct current. Thereafter the voltage across the glow tube remains constant, but the voltage across the resistance 18 rises linearly with respect to the voltage at the point 19, and thus the voltage across the resistance 18 responds to the voltage on the condenser 5. When the desired voltage is attained across the condenser 5, the grid control lead 14 supplies a sufficiently negative voltage to the grids of the tubes 6 so as to cause said tubes to become extinguished. Due to the presence of the alternating voltage 15 in the grid lead of one of the tubes 6, that tube continues to fire in delayed phase, the angle of which increases and thus causes the tube to supply smaller increments of charging current to the condenser 5. When the condenser reaches its final value, the voltage supplied by the grid control lead 14 is sufficient to extinguish the last tube 6. However, this tube with the alternating voltage superimposed on its grid acts as a trickle charger whenever the charge on the condenser 5 leaks off to a sufficient degree to require such a trickle charge supply. A voltmeter 21 may be connected across the condenser 5, if desired. The operation of the glow tube 17 and its associated control circuit is described more fully and claimed in my copending application, Serial No. 461,571, filed October 10, 1942, now Patent No. 2,383,492, dated August 28, 1945.

In order to discharge the condenser 5 into the resistance welding load, a controlled discharge tube 22 is connected between the negative side of the condenser 5 and one end of the primary winding 4, the positive side of the condenser 5 being connected directly to the other end of said primary winding. The tube 22 is preferably of the type having a mercury pool cathode 23, an anode 24, and an igniting electrode 25 which when supplied with a pulse of igniting current initiates an arc spot on the surface of the mercury pool 23. In order to supply igniting impulses to the igniting electrode 25, there is provided an impulse generator 26. This may be a standard impulse generator employing a tetrode such as of the present 2050 type. This generator is adjustable to allow a variation in the number of impulses which it supplies per second. In a particular embodiment of my invention I utilized an impulse generator which supplied impulses which could be adjusted in frequency from five to twenty impulses per second. The impulses delivered by the generator 26 are preferably amplified by an impulse amplifier 27. Both the generator 26 and the amplifier 27 may be energized from a suitable source of alternating current 28. In order to control the number of impulses which are delivered to the tube 22 during a single welding operation, an automatic time delay relay 29 is utilized. This relay closes a controlling circuit for the impulse generator 26, causing that generator to operate for a sufficient period of time for a welding operation to be completed, whereupon the relay 29 opens the control circuit for a sufficient waiting time until the next welding operation is to be initiated. The relay 29 may be adjustable so as to provide for a varying period of time during which the impulse generator is maintained in operation. Of course the generator 26, the amplifier 27, and the time delay relay 29 are all standard pieces of apparatus so that it is not necessary to include further details thereof in this application.

Each time an igniting impulse is supplied to the igniting electrode 25, a discharge is initiated in the tube 22 and the condenser 5 discharges into the primary winding 4. It is desirable to use a pickup circuit consisting of a condenser 30 in series with a resistance 31 across the tube 22 so as to assist in the reliable initiation of a discharge in the tube 22 each time an igniting impulse is supplied to the electrode 25.

The operation of the system each time an igniting impulse is supplied to the tube 22 may be understood more readily with reference to Fig. 2, in which the curve E represents the voltage on the condenser 5 and the curve I represents the welding current, both curves being plotted along a horizontal time axis. At the time $T_0$ the condenser 5 is assumed to be fully charged, and an igniting impulse is supplied to the electrode 25. Thereupon the tube 22 starts to conduct current and the voltage E drops to zero at the time $T_1$, while the current I rises to a maximum value at that time. During the time $T_0$—$T_1$ flux was being built up in the transformer 3 so that, after the time $T_1$, the collapse of the flux causes the current to continue flowing in the same direction, although decreasing in magnitude, and thus to recharge the condenser 5 to an inverse value, which reaches a maximum at the time $T_2$, at which time the current I falls to zero. The voltage on the condenser 5 at the time $T_2$ would tend to discharge back through the primary winding 4, causing a reversal of current to take place. However, the tube 22 being a rectifier cannot carry such a reversed current flow. If the current flow terminated at the time $T_2$, the inverse voltage would be trapped on the condenser 5 in a direction which would not be useful for welding purposes.

In order to permit the inverse current flow, an additional controlled tube 32 is connected across the tube 22. The tube 32 likewise is preferably of the type having a mercury pool cathode 33, an anode 34, and an igniting electrode 35 which is adapted to initiate an arc spot on the surface of the pool 33 when supplied with an igniting impulse. The igniting impulse is supplied to the electrode 35 by having that electrode connected through a controlled discharge tube 36 in series with a resistance 37 to the anode 34. The controlled tube 36 may have its grid connected through a resistance to its anode, thus forming essentially a rectifier in series with the igniting electrode 35, of such a polarity as to deliver a pulse of current to the electrode 35 when the anode 34 of that tube becomes sufficiently positive. At the time $T_2$ the voltage across the rectifier 22 reverses, and thus likewise the voltage across the tube 32 reverses. Upon such reversal of voltage, the tube 36 conducts current, supplying an igniting impulse to the electrode 35, and thus causing the tube 32 to start conducting current. This permits the inverse pulse of current, as shown in Fig. 2, in the time interval $T_2$—$T_4$ to flow. Thus the condenser 5 discharges back through the primary winding 4 so that at the time $T_3$ its voltage has again fallen to zero. However, due to the inductive action of the transformer 3, the current continues to flow, falling to zero at the time $T_4$, at which time the condenser has re-gained a charge which, however, in this case is in the same direction as the initial charge and is thus available to assist in the subsequent welding operation. Since at the time T4 the current falls to zero, the tube 32 becomes extinguished, and in absence of another igniting impulse supplied to the electrode 25, the tube 22 does not re-ignite, and therefore the current pulse is completed at the time T4. Sometime thereafter the rectifiers 6 again supply charging current to the condenser 5 which builds up its voltage from the value which it possesses at the time T4 to the original fully charged value necessary for the production of a subsequent welding operation.

It is, of course, desirable that the rectifiers 6 do not attempt to supply charging current to the condenser 5 during the time it is supplying a welding current impulse. For this purpose a hold-off circuit is utilized comprising a rectifier tube 37' connected in series with a resistance 40 and a condenser 41 across the primary winding 4. The rectifier tube 37' has a cathode 38 preferably of the constantly energized type, such as a heated filament, connected to the end of the primary winding 4 to which the anode 24 of the tube 22 is connected. The tube 37' also has an anode 39 which is connected to the resistance 40. A conductor 42 connects the point intermediate the anode 39 and the resistance 40 to the grid control lead 14. When the tube 22 is ignited, the main discharge circuit is completed and supplies the voltage of the condenser 5 across the primary winding 4. This voltage is likewise connected across the hold-off circuit. The rectifier 37' is of such a polarity as to pass charging current to the condenser 41 which quickly becomes charged to the voltage of the condenser 5. It will be seen that under these conditions the lower plate of the condenser 41 is made positive while the upper plate becomes negative. This negative voltage is impressed by the conductor 42 to the grid lead 14, and thus holds off all of the rectifiers 6 from further conduction of current as long as this hold-off voltage is present. As the voltage on the condenser 5 decreases and reverses, the condenser 41 cannot discharge through the tube 37', due to its rectifying action. Therefore the condenser 41 can only lose its charge by a leakage discharge path provided by the resistance 40, conductors 42 and 20, and resistance 18. This discharge circuit has a sufficiently long time constant so that the negative hold-off voltage is maintained on the grids of the tubes 6 until a sufficient period of time after the completion of such a welding current impulse as is illustrated in Fig. 2. The operation of such a hold-off circuit is more fully described and claimed in my copending application, Serial No. 434,670, filed March 14, 1942.

In Fig. 3 I have illustrated the sequence of operations which occur in a practical embodiment of the arrangement as illustrated in Fig. 1. In Fig. 3, $a$ illustrates the welding current impulses, $b$ illustrates the variation is in condenser voltage, $c$ shows the pulses of charging current supplied to the condenser 5, and $d$ shows the igniting impulses which are supplied to the igniting electrode 25 of the tube 22.

As will be seen from the curve $a$, the frequency of each welding current impulse is determined solely by the circuit constants of the condenser discharge and welding circuit. Thus we see that the frequency of each of these welding current impulses is independent of any line frequency and is solely dependent upon the circuit constants as above described. By adjusting these constants the frequency may be adjusted. Likewise it will be seen that since the frequency of each current impulse is fixed by the circuit constants of the welding load, the current is supplied to that load with maximum effectiveness. I prefer to use frequencies for each welding current impulse substantially higher than that of ordinary commercial line frequencies, and more particularly of the order of about 200 cycles per second or more. The curve $d$ shows that the number of impulses of welding current supplied during any welding period is independently controlled by the frequency of the impulse generator. At the time T0, indicated in Fig. 3, the relay 29 closes the circuit to the impulse generator 26, thus initiating the welding period. At the time T1, likewise represented in Fig. 3, the relay 29 opens the control circuit to the impulse generator 26, thus terminating the welding period. Thus by adjusting the frequency of the impulse generator 26, the number of welding current impulses supplied during the welding period can be readily selected. Likewise by adjusting the time during which the relay 29 maintains the control contacts closed, the length of the welding period can be adjusted. It will be readily seen that the system which I have illustrated affords a wide variety of adjustments making for a very flexible and adaptable system.

Due to the adaptability of the system described above, it is particularly adaptable for use in portable welding machines capable of welding alloy steel and light gauge aluminum. The frequency of about 200 cycles or more which is supplied to the primary winding 4 allows a considerable decrease in the transformer size. In a practical instance I have found that the requisite power can be supplied to the welding load with a small-sized transformer and with a low secondary voltage of about 60 volts, thus eliminating the necessity for using excessively high voltages which the art had previously been compelled to use. Of course, due to the storage aspect of the condenser 5, the load which is drawn from the power lines is equally distributed over the three-phase line which, as previously described herein, is a desirable mode of operation. Since the power which is supplied for a single welding operation is subdivided into separate discrete impulses, each impulse being stored in a condenser, by making each impulse shorter in duration, the peak power which can be supplied to the welding load is greatly amplified, although the total power during a single welding operation may remain at a relatively low level. In many types of welding operation high power peaks of the foregoing type are very desirable, and produce greatly improved welds.

In one embodiment of my invention I used a welding transformer with a ratio of transformation of fifty to one. The capacity of the condenser 5 was about 600 mfd., while the inductance of its associated discharge circuit was 0.6 microhenry. The voltage to which the condenser 5 was charged was approximately 3000 volts, and with the above ratio of transformation, the secondary welding transformer voltage did not exceed 60 volts. With above constants of capacity and inductance, the natural frequency of each welding impulse was about 165 cycles per second. The secondary welding current peak was about $10^5$ amperes maximum. The welding transformer had about one hundred fifty primary and three secondary turns. The core material was of a special magnetic alloy known as "hypersil," utilizing 120,000 flux lines per square inch and giving a resultant total flux of about 2400 kilolines maximum, without saturation and using only twenty square inches cross-section of transformer core.

Of course it is to be understood that this invention is not limited to the particular details as described above as many equivalents will suggest themselves to those skilled in the art. It is accordingly desired that the appended claims be given a broad interpretation commensurate with the scope of the invention within the art.

What is claimed is:

1. A welding system comprising a condenser, means for charging said condenser, a resistance welding load, means for discharging said condenser into said welding load by an oscillating discharge whose frequency is determined primarily by the condenser and its associated discharge circuit, said last-named means limiting said discharge to substantially a single oscillation, and means for operating said discharging means a plurality of times for producing a single welding operation.

2. A welding system comprising a condenser, means for charging said condenser, a resistance welding load, means for discharging said condenser into said welding load by an oscillating discharge whose frequency is determined primarily by the condenser and its associated discharge circuit, said last-named means limiting said discharge to substantially a single oscillation, and means for operating said discharging means a plurality of times for producing a single welding operation, the frequency of the repetition of operation of said discharge means being substantially lower than the frequency of said current impulses themselves.

3. A system comprising a condenser, means for charging said condenser, a load, a controlled rectifying tube connected in series between said condenser and said load for discharging said condenser into said load by an oscillating discharge whose frequency is determined primarily by the condenser and its associated discharge circuit, said tube being of the type which conducts for a single conducting period upon the supply of an igniting impulse thereto, and a second rectifying discharge tube connected with inverse polarity across said first-mentioned tube, said second tube being arranged to conduct whenever a substantial voltage is applied thereto in the conducting direction.

4. A welding system comprising a condenser, means for charging said condenser, a resistance welding load, a controlled rectifying tube connected in series between said condenser and said welding load for discharging said condenser into said welding load by an oscillating discharge whose frequency is determined primarily by the condenser and its associated discharge circuit, said tube being of the type which conducts for a single conducting period upon the supply of an igniting impulse thereto, a second rectifying discharge tube connected with inverse polarity across said first-mentioned tube, said second tube being arranged to conduct whenever a substantial voltage is applied thereto in the conducting direction, and means for supplying a plurality of spaced igniting impulses to said first tube for producing a plurality of discharges from said condenser during a single welding operation.

5. A welding system comprising a condenser, means for charging said condenser, a resistance welding load, a controlled rectifying tube connected in series between said condenser and said welding load for discharging said condenser into said welding load by an oscillating discharge whose frequency is determined primarily by the condenser and its associated discharge circuit, said tube being of the type which conducts for a single conducting period upon the supply of an igniting impulse thereto, a second rectifying discharge tube connected with inverse polarity across said first-mentioned tube, said second tube being arranged to conduct whenever a substantial voltage is applied thereto in the conducting direction, and means for supplying a plurality of spaced igniting impulses to said first tube for producing a plurality of discharges from said condenser during a single welding operation, the frequency of the repetition of said last-named means being substantially lower than the frequency of said current impulses themselves.

6. A welding system comprising a condenser, means for charging said condenser, a resistance welding load, means for discharging said condenser into said welding load by an oscillating discharge whose frequency is determined primarily by the condenser and its associated discharge circuit, said last-named means limiting said discharge to substantially a single oscillation, means for operating said discharging means a plurality of times for producing a single welding operation, and means for preventing said charging means from supplying charging current to said condenser during each of said discharge oscillations.

7. A welding system comprising a condenser, means for charging said condenser, a resistance welding load, means for discharging said condenser into said welding load by an oscillating discharge whose frequency is determined primarily by the condenser and its associated discharge circuit, said last-named means limiting said discharge to substantially a single oscillation, means for operating said discharging means a plurality of times for producing a single welding operation, and means for varying the frequency of operation of said last-named means.

8. A welding system comprising a condenser, means for charging said condenser, a resistance welding load, a controlled rectifying tube connected in series between said condenser and said welding load for discharging said condenser into said welding load by an oscillating discharge whose frequency is determined primarily by the condenser and its associated discharge circuit, said tube being of the type which conducts for a single conducting period upon the supply of an igniting impulse thereto, a second rectifying discharge tube connected with inverse polarity across said first-mentioned tube, said second tube being arranged to conduct whenever a substantial voltage is applied thereto in the conducting direction, and means for supplying a plurality of regularly spaced ignition impulses to said first-mentioned tube to discharge said condenser a plurality of times during a single welding operation, and means for recharging said condenser to substantially the same potential between each discharge thereof.

9. A system comprising a condenser, unidirectional voltage means successively charging said condenser with the same polarity for each of said charges, a load circuit, a controlled rectifier tube connected in series between said condenser and said load circuit for discharging said condenser into said load by an oscillating discharge whose frequency is determined primarily by the capacitance of said condenser and the inductance of its associated discharge circuit, said tube being of the type which conducts for a single conducting period upon the supply of an igniting impulse thereto, a second rectifying discharge tube connected with inverse polarity across said first-mentioned tube, said second tube being arranged to conduct whenever a substantial voltage is applied thereto in the conducting direction, and means for supplying an igniting impulse to said first-named tube following each of said charges, the constants of said condenser and its associated discharge circuit being related so that the period of said oscillating discharge is substantially less than the interval between successive igniting impulses.

10. In combination, a capacitor, means adapted to function as a source of periodically pulsating potential in circuit with said capacitor for supplying charging current thereto, electric discharge valve means of the arc-like type interposed between said source and capacitor for controlling the supply of charging current to said capacitor, a control circuit connected to said valve means and arranged to render said valve means conductive when a potential greater than a predetermined critical value is impressed therein in a positive pulsation of said source, and means adapted to impress in said control circuit a second periodic potential of the same periodicity as said source potential and having a sloping wave front superimposed on a third potential which gradually decreases as the capacitor potential increases above a preselected magnitude, the magnitude of said second and third potentials being such that the resultant potential in said control circuit first rises above said critical value at substantially the same instant early in each positive pulsation while said capacitor potential is below said preselected magnitude and at an instant gradually later in each succeeding positive pulsation as said third potential decreases.

11. In combination, a capacitor, means adapted to function as a source of periodically pulsating potential in circuit with said capacitor for supplying charging current thereto, electric discharge valve means of the arc-like type interposed between said source and capacitor for controlling the supply of charging current to said capacitor, a control circuit connected to said valve means and arranged to render said valve means conductive when a potential greater than a predetermined critical value is impressed therein in a positive pulsation of said source, and means adapted to impress in said control circuit a second periodic potential of the same periodicity but displaced in phase relative to said source and having a sloping wave front superimposed on a third potential which gradually decreases as the capacitor potential increases above a preselected magnitude.

12. In combination, a capacitor, means adapted to function as a source of periodically pulsating potential in circuit with said capacitor for supplying charging current thereto, electric discharge valve means of the arc-like type interposed between said source and capacitor for controlling the supply of charging current to said capacitor, a control circuit connected to said valve means and arranged to render said valve means conductive when a potential greater than a predetermined critical value is impressed therein in a positive pulsation of said source, and means adapted to impress in said control circuit a second potential which first rises above said critical value at substantially the same instant early in each positive pulsation while the potential charge on said capacitor is below a preselected magnitude and at an instant gradually later in each succeeding positive pulsation as the capacitor potential increases above said preselected magnitude, the rate of change of the instants at which said valve means is rendered conductive being dependent upon the rate of increase of said capacitor potential, said potential impressing means including means associated with said capacitor and effective to amplify changes in the capacitor potential above said preselected magnitude only.

13. For use in charging a capacitor to a potential of a preselected magnitude from a source of periodically pulsating potential in circuit therewith, the combination comprising electric discharge valve means of the arc-like type interposed between said source and capacitor for controlling the supply of charging current to said capacitor, a control circuit connected to said valve means and arranged to render said valve means conductive when a potential greater than a predetermined critical value is impressed therein in a positive pulsation of said source, and means adapted to impress in said control circuit a second periodic potential of the same frequency as said source and having a sloping wave front superimposed on a third potential which gradually decreases as said capacitor potential increases above a second preselected magnitude less than said first preselected magnitude, the magnitude of said second and third potentials being such that the resultant potential first rises above said critical value at substantially the same instant early in each positive pulsation while said capacitor potential is below said second preselected magnitude and at an instant gradually later in each succeeding positive pulsation as said third potential decreases, said last means including means responsive to said capacitor potential for decreasing said third potential at a rate dependent upon the rate of increase of said capacitor potential in such manner that the resultant potential does not rise above said critical value when the capacitor potential is at said first preselected magnitude.

14. Apparatus according to claim 13 in which the means responsive to said capacitor potential for decreasing said third potential comprises electronic amplifying means in circuit with said capacitor and effective to amplify changes in the capacitor potential above said second preselected magnitude only.

15. A control system comprising a capacitor, means for charging said capacitor, a discharge circuit connected across said capacitor and including an inductive load and normally non-conductive electric valve means interposed between said capacitor and load whereby an oscillating current tends to flow in said circuit when said valve means is conductive, and means for rendering said valve means conductive to permit a single cycle only of oscillating current to flow in said circuit.

16. For use in supplying current to a load through a magnetic core transformer having primary and secondary windings with said secondary winding being connected in circuit with said load, the combination comprising a capacitor, means for precharging said capacitor, means including normally non-conductive electric valve means connecting said primary winding across said capacitor whereby an oscillating current tends to flow through said primary winding when said valve means is conductive, and means for rendering said valve means conductive to permit a single cycle only of oscillating current to flow through said primary winding.

17. For use in supplying current to a load through a magnetic core transformer having primary and secondary windings with said secondary winding being connected in circuit with said load, the combination comprising a capacitor, means for precharging said capacitor, circuit means including a pair of inversely connected electric discharge valves of the arc-like type connecting said primary winding across said capacitor, means for rendering one of said valves conductive to effect discharge of said capacitor through said primary winding whereby said capacitor is subsequently charged inversely, and means operable when said one valve becomes non-conductive for rendering the other valve conductive to effect discharge of the inverse charge on said capacitor through said primary winding.

18. For use in supplying current to a load through a magnetic core transformer having primary and secondary windings with said secondary winding being connected in circuit with said load, the combination comprising a capacitor, means for precharging said capacitor, circuit means including a pair of inversely connected electric discharge valves of the arc-like type connecting said primary winding across said capacitor, means for rendering one of said valves conductive to effect discharge of said capacitor through said primary winding whereby said capacitor is subsequently charged inversely, and means responsive to the inverse charge on said capacitor and operable when said one valve becomes non-conductive for rendering the other valve conductive to effect discharge of the inverse charge on said capacitor through said primary winding.

19. A control system comprising a capacitor, means for charging said capacitor, a discharge circuit connected across said capacitor and including an inductive load and normally non-conductive electric valve means of the arc-like type interposed between said capacitor and load and adapted to conduct current in either direction through said discharge circuit, whereby an oscillating current tends to flow in said circuit when said valve means is conductive, and means for rendering said valve means conductive to permit a single cycle only of oscillating current to flow in said circuit.

20. A control system comprising a capacitor, means for charging said capacitor, an inductive load, circuit means including a pair of inversely connected electric discharge valves of the arc-like type connecting said load across said capacitor, means for rendering one of said valves conductive to effect discharge of said capacitor through said load, whereby said capacitor is subsequently charged inversely by the current flowing through said one valve as the result of energy released by said inductive load as the capacitor discharge is completed, said energy being stored in said inductive load during said discharge, and means operable when said one valve becomes non-conductive for rendering the other of said valves conductive to effect discharge of the inverse charge on said capacitor through said inductive load.

21. Apparatus for use in supplying current to a load comprising a capacitor, charging means connected across said capacitor and tending to supply current therethrough to charge the same whenever the capacitor voltage is below a predetermined value, circuit means connecting said capacitor across said load to effect discharge of said capacitor therethrough, said circuit means including valve means interposed between said capacitor and load for controlling the flow of current therebetween and impedance means in series with said valve means whereby a voltage is developed across said impedance means in response to current conducted through said valve means, means responsive to said voltage and connected to said charging means for preventing operation of said charging means only during current flow through said valve means, and control means connected to said valve means to cause said valve means to be conductive during each of a plurality of spaced intervals.

22. Apparatus for use in supplying current to a load through a magnetic core transformer having primary and second windings with said secondary winding being connected in circuit with said load, comprising a capacitor, means connected across said capacitor to supply charging current therethrough whenever the capacitor potential is below a predetermined value, means including normally non-conductive valve means connecting said capacitor in circuit across said primary winding whereby an oscillating current tends to flow through said primary winding when said valve means is conductive, control means connected to said valve means for rendering the same conductive at spaced intervals to permit a full cycle of oscillating current to flow through said primary winding, impedance means in series with said valve means whereby a voltage is developed across said impedance means by current conducted through said valve means, and means responsive to said voltage and connected to said charging means for preventing operation of said charging means only while said valve means is conductive.

HANS KLEMPERER.

REFERENCES CITED

The following references are of record in the file of this patent:

UNITED STATES PATENTS

| Number | Name | Date |
| --- | --- | --- |
| 1,168,346 | Thomson | Jan. 18, 1916 |
| 1,769,148 | Lunn | July 1, 1930 |
| 2,179,105 | Sidney | Nov. 7, 1939 |
| 2,216,329 | Stansbury | Oct. 1, 1940 |
| 2,276,796 | Rogers | Mar. 17, 1942 |
| 2,277,146 | Roby | Mar. 24, 1942 |
| 2,287,540 | Vang | June 23, 1942 |
| 2,287,544 | Vang | June 23, 1942 |
| 2,295,293 | Rogers | Sept. 8, 1942 |
| 2,298,570 | Leathers | Oct. 13, 1942 |

FOREIGN PATENTS

| Number | Country | Date |
| --- | --- | --- |
| 519,353 | Great Britain | Mar. 21, 1940 |